US012037203B2

(12) United States Patent
Kiyokawa (10) Patent No.: US 12,037,203 B2
(45) Date of Patent: Jul. 16, 2024

(54) PALLET INSPECTION DEVICE

(71) Applicant: Daifuku Co., Ltd., Osaka (JP)

(72) Inventor: Wataru Kiyokawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 409 days.

(21) Appl. No.: 17/587,830

(22) Filed: Jan. 28, 2022

(65) Prior Publication Data

US 2022/0242678 A1    Aug. 4, 2022

(30) Foreign Application Priority Data

Jan. 29, 2021    (JP) ................. 2021-013177

(51) Int. Cl.
| | | |
|---|---|---|
| *B65G 47/64* | (2006.01) | |
| *B65D 19/38* | (2006.01) | |
| *B65G 47/02* | (2006.01) | |
| *B65B 57/02* | (2006.01) | |

(52) U.S. Cl.
CPC ............. *B65G 47/02* (2013.01); *B65D 19/38* (2013.01); *B65B 57/02* (2013.01); *B65G 2203/0275* (2013.01); *B65G 2203/044* (2013.01)

(58) Field of Classification Search
None
See application file for complete search history.

(56) References Cited

U.S. PATENT DOCUMENTS

| | | | | |
|---|---|---|---|---|
| 1,099,314 A | * | 6/1914 | Pitkin .................... | B65D 19/38 |
| | | | | 104/238 |
| 6,095,317 A | * | 8/2000 | Waldner ............... | B65G 47/642 |
| | | | | 198/463.3 |
| 2009/0244551 A1 | * | 10/2009 | Lutz ..................... | B65G 65/005 |
| | | | | 356/630 |
| 2013/0213769 A1 | * | 8/2013 | Plakolm ............... | B23Q 7/1442 |
| | | | | 198/463.3 |
| 2022/0340360 A1 | * | 10/2022 | Kiyokawa ............... | B66F 9/141 |
| 2023/0257211 A1 | * | 8/2023 | Kiyokawa .............. | B65G 47/52 |
| | | | | 198/373 |

FOREIGN PATENT DOCUMENTS

| | | | | |
|---|---|---|---|---|
| EP | 4036560 A1 | * | 8/2022 | ............. B65D 19/38 |
| JP | 2003221018 A | | 8/2003 | |
| JP | 4154672 B2 | * | 9/2008 | |
| JP | 6512019 B2 | * | 5/2019 | |
| WO | WO-2006004339 A1 | * | 1/2006 | ............. B65G 1/023 |

* cited by examiner

*Primary Examiner* — Joseph A Dillon, Jr.
(74) *Attorney, Agent, or Firm* — The Webb Law Firm (57) ABSTRACT

A pallet is housed while being supported from below by a pair of shelf-side support surfaces. The shelf-side support surfaces extend in a second direction and are separate from each other in a first direction by a predetermined separation distance. A pallet inspection device includes a first lift member, a second lift member, a raising and lowering mechanism, and an inspection unit. The first lift member has a first support surface. The second lift member has a second support surface. The first support surface and the second support surface extend in a width direction and are separate from each other in a transportation direction by a predetermined setting distance. The setting distance corresponds to the separation distance between the pair of shelf-side support surfaces. The inspection unit inspects the pallet for bending while the first support surface and the second support surface are at a projecting position.

5 Claims, 7 Drawing Sheets

PALLET INSPECTION DEVICE

CROSS-REFERENCE TO RELATED APPLICATION

This application claims priority to Japanese Patent Application No. 2021-013177 filed Jan. 29, 2021, the disclosure of which is hereby incorporated by reference in its entirety.

BACKGROUND OF THE INVENTION

1. Field of the Invention

The present invention relates to a pallet inspection device that inspects a pallet placed on a transportation surface of a conveyor that is transported in a specified transportation direction.

2. Description of the Related Art

A known pallet inspection device of this type is described in JP 2003-221018A (Patent Document 1). The reference signs in brackets used in the description of the related art are those of Patent Document 1.

A pallet inspection device (12) described in Patent Document 1 is provided with a rectangular guiding space portion (51) through which a pallet (1) passes and a plurality of damage detection limit switches (53) that detect damage in a plate material (3) constituting the upper and lower surface of the pallet (1). When the pallet (1) placed on a transportation surface of a conveyor is guided by the guiding space portion (51), the plurality of damage detection limit switches (53) come into contact with the surface of the plate material (3). In a case where there is a chip or the like in the plate material (3), the inclination angle of the damage detection limit switch (53) is changed by the damaged section. Thus, damage such as a chip in the pallet (1) can be automatically detected.

With the pallet inspection device (12) of Patent Document 1, as described in paragraph [0005], this technology is intended for detecting damage such as a chip in the pallet (1) caused by impact between the pallet (1) and the fork portion of a forklift. However, even in a case where there is no clear damage such as a chip in the pallet (1), if the strength of the pallet (1) has decreased due to deterioration over time, there may be significant bending greater than an acceptable limit in the pallet (1) caused by the support state of the pallet (1) or the weight of the loads placed on the pallet (1). For example, in a case where the pallet (1) is housed in storage shelves with a structure that only supports the end portions on both sides of the pallet (1), the weight of the load placed on the pallet (1) may cause in the pallet (1) significant bending greater than the acceptable limit. Also, when such significant bending occurs in the pallet (1), the pallet (1) may be unable to be appropriately retrieved from the storage shelves by an automated transport device or the like in an automated warehouse, for example. In this case, a worker needs to manually retrieve the pallet (1). In a case where the pallet (1) is housed in the upper portions of the storage shelves, such retrieval work may be difficult.

SUMMARY OF THE INVENTION

In light of the foregoing, it is desirable that a pallet is inspected for bending likely to occur when the pallet is housed in storage shelves before the pallet is housed in the storage shelves.

A pallet inspection device according to the present disclosure inspects a pallet transported in a predetermined transportation direction while the pallet is on a transportation surface of a conveyor, wherein with (i) a width direction being a direction orthogonal to the transportation direction as seen in a vertical direction aligned with the vertical direction, (ii) a first direction being a direction of the pallet being transported by the conveyor which direction is along the transportation direction, and (iii) a second direction being a direction of the pallet being transported by the conveyor which direction is along the width direction, the pallet is transported to storage shelves by the conveyor, and is housed in the storage shelves while the pallet is supported from below by a pair of shelf-side support surfaces; with reference to an orientation of the pallet housed in the storage shelves, the pair of shelf-side support surfaces extend in the second direction and are separate from each other in the first direction by a predetermined separation distance; the conveyor is provided with a first lift member a second lift member, a raising and lowering mechanism, and an inspection unit all attached to the conveyor; the first lift member has a first support surface that supports a pallet bottom surface, which is a bottom surface of the pallet; the second lift member has a second support surface that supports the pallet bottom surface; the raising and lowering mechanism is configured to raise and lower the first lift member and the second lift member between (i) a retracted position, at which the first support surface and the second support surface are lower than the transportation surface, and (ii) a projecting position, at which the first support surface and the second support surface are higher than the transportation surface; the first support surface and the second support surface each extend in the width direction and are separate from each other in the transportation direction by a predetermined setting distance; the setting distance corresponds to the separation distance of the pair of shelf-side support surfaces; and the inspection unit inspects the pallet for bending while the pallet is supported by the first support surface and the second support surface at the projecting position.

According to the present configuration, the first support surface and the second support surface that support the pallet bottom surface are raised and lowered between the retracted position and the projecting position by the raising and lowering mechanism Thus, the pallet can be detected for bending when the pallet is raised higher than the transportation surface. Also, using the orientation of the pallet as a reference, the first support surface and the second support surface extend in the same direction as the pair of shelf side support surfaces of the storage shelves and are formed separated by a distance corresponding to the separation distance between the pair of shelf side support surfaces. Accordingly, on the conveyor, a similar state to that when the pallet is supported from below by the pair of shelf side support surfaces in the storage shelves can be reproduced, and bending in the pallet can be detected. Thus, according to the present configuration, while the pallet is being transported by the conveyor before being housed in the storage shelves, the pallet can be inspected for bending likely to occur when housed in the storage shelves.

According to the present configuration, before the pallet is housed in the storage shelves, the pallet can be appropriately inspected for bending likely to occur when housed in the storage shelves.

DETAILED DESCRIPTION OF PREFERRED EMBODIMENTS

1. Overall Outline

An example of a pallet inspection device according to an embodiment of the present invention applied to an article housing facility will be described on the basis of the drawings.

Figure 1:
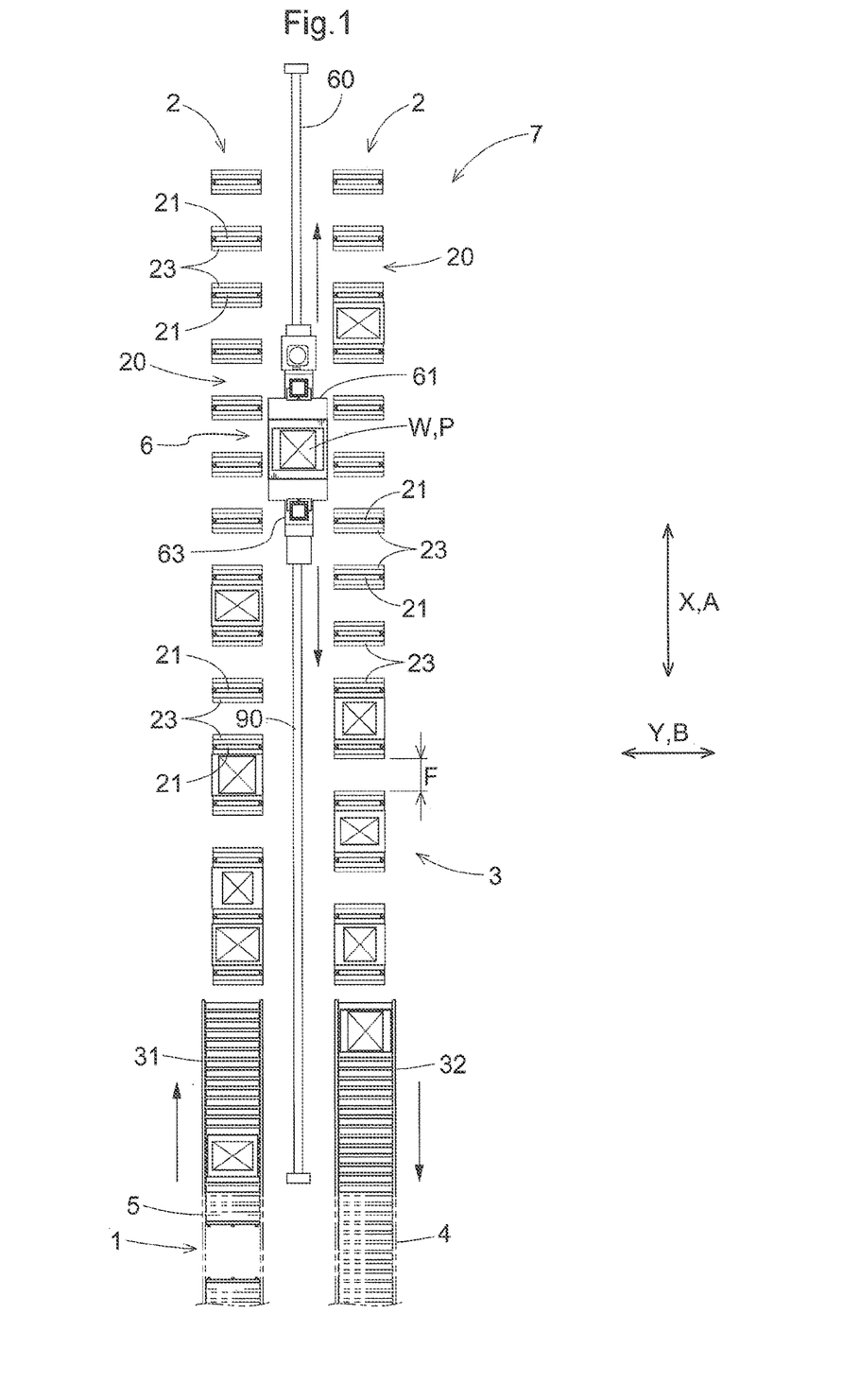
FIG. 1 is an overall plan view of an article housing facility.

As illustrated in FIG. 1, an article housing facility 7 is provided with an automated warehouse 3 including storage shelves 2 capable of housing an article W together with a pallet P, a carry-in conveyor 5 that carries in the pallet P carrying the article W from the outside into the automated warehouse 3, a carry-out conveyor 4 that carries out the pallet P carrying the article W from the automated warehouse 3 to the outside, and a pallet inspection device 1 that inspects the pallet P. In the present embodiment, the pallet inspection device 1 is disposed at the carry-in conveyor 5. The pallet inspection device 1 inspects the pallet P being transported by the carry-in conveyor 5 with the article W placed on the pallet P. In the present example, the carry-in conveyor 5 corresponds to "conveyor".

Hereinafter, the direction the pallet P is transported by the carry-in conveyor 5 described above is defined as a transportation direction X, and a direction orthogonal to the transportation direction X as seen in a vertical direction Z is defined as a width direction Y. Also, the direction aligned with the transportation direction X of the pallet P when transported by the carry-in conveyor 5 is defined as a first direction A, and a direction aligned with the width direction Y is defined as a second direction B. Note that the first direction A and the second direction B are directions based on the pallet P, and, thus in a case where the orientation of the pallet P is swiveled around from the orientation during transportation by the carry-in conveyor 5, the first direction A and the second direction B both swivel together with the pallet P.

2. Pallet

Figure 3:
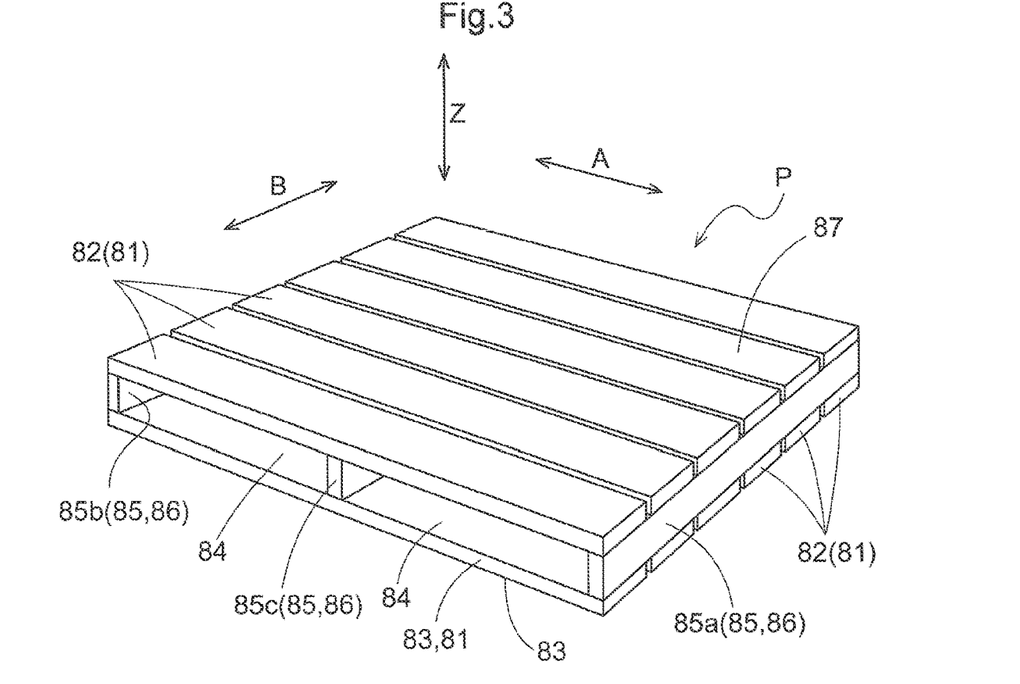
FIG. 3 is a perspective view of a pallet.
Figure 4:
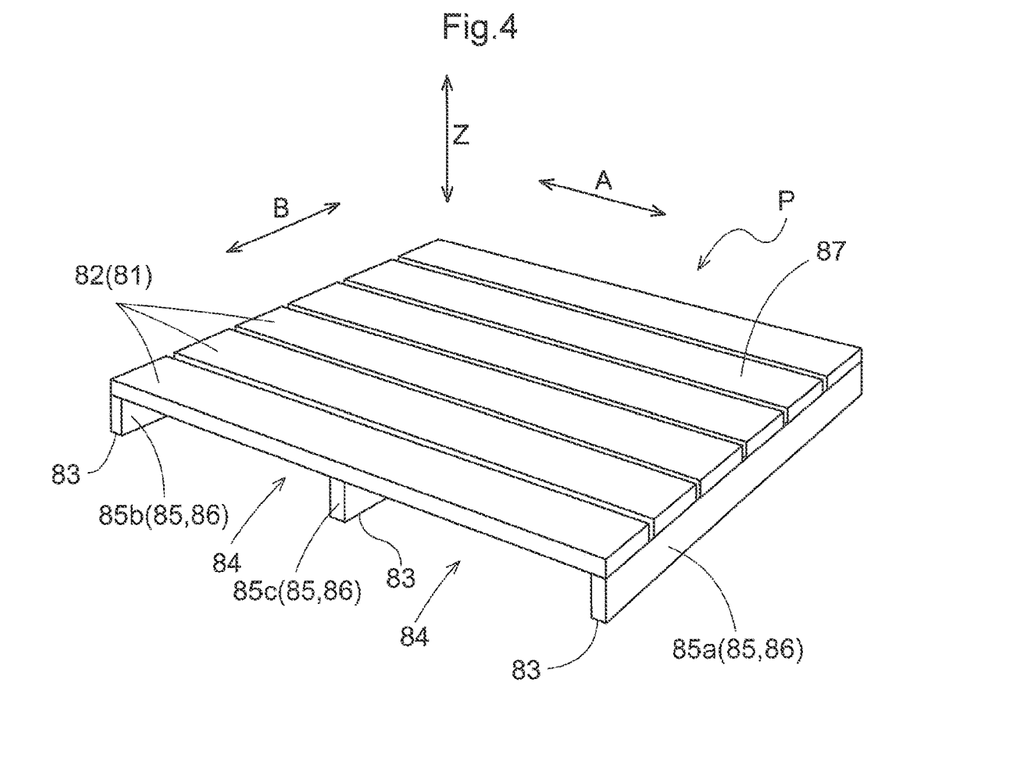
FIG. 4 is a perspective view of a pallet with a different shape.

The pallet P used in the article housing facility 7 will now be described. As illustrated in FIGS. 3 and 4, the pallet P is provided with placement surface member 81 where the article W is placed. As illustrated in FIG. 3, the pallets P used in the present embodiment include the pallet P provided with the placement surface member 81 on both the upper side and the lower side in the vertical direction Z as illustrated in FIG. 3 and the pallet P provided with the placement surface member 81 on only the upper side as illustrated in FIG. 4.

As illustrated in FIGS. 3 and 4, the placement surface member 81 is a member that constitutes a planar-shaped placement surface 87 that the article W is placed on. Thus, the placement surface member 81 is formed in an overall flat plate-like shape. In the present embodiment, the placement surface member 81 is constituted by a plurality of strip-shaped members 82 disposed side by side, the strip-shaped members 82 having a rectangular shape as seen in the vertical direction Z. In this example, the plurality of strip-shaped members 82 are disposed side by side with a certain interval between them and with the long side direction aligned with the first direction A. In the illustrated example, six of the strip-shaped members 82 are disposed. However, the configuration is not limited thereto, and, for example, the number of strip-shaped members 82 may be less than six or may be more than six. Also, the placement surface member 81 may be a single, integrally-formed top board.

The pallet P is provided with a plurality of frame body members 85 that constitute a frame body 86 that supports the placement surface member 81 from below. The plurality of frame body members 85 are disposed separated from one another in the first direction A and are configured to support the placement surface member 81 from below. In the present embodiment, the plurality of frame body members 85 are each formed in a rectangular prism-like shape. Also, the plurality of frame body members 85 are disposed with the long side direction aligned in the second direction B. In other words, each one of the plurality of frame body members 85 is disposed aligned in the direction orthogonal to the plurality of strip-shaped members 82.

In the present embodiment, as illustrated in FIGS. 3 and 4, the plurality of frame body members 85 include a first frame member 85a, a second frame member 85b, and a third frame member 85c. In the illustrated example, the first frame member 85a and the second frame member 85b are located on the two outer sides in the first direction A. Furthermore, the third frame member 85c is disposed at a position in-between the first frame member 85a and the second frame member 85b in the first direction A. Also, as illustrated in FIGS. 3 and 4, the placement surface member 81 is in contact with and fixed to the surface on at least one side in the vertical direction Z of each one of the three frame body members 85. Thus, insertion holes 84 where the fork of a forklift or other such transport device can be inserted are formed at two sections side by side in the first direction A in the pallet P. In the pallet P illustrated in FIG. 3, two placement surface members 81 are attached on both sides in the vertical direction Z. In this example, of the upper and lower placement surface member 81, the upper surface of the placement surface member 81 located on the upper side during transportation corresponds to the placement surface 87 where the article W is placed, and the lower surface of the placement surface member 81 located on the lower side corresponds to the bottom surface of the pallet P, i.e., a pallet bottom surface 83. In the pallet P illustrated in FIG. 4, the placement surface member 81 is attached only on the upper side in the vertical direction Z. In this case, the upper surface of the placement surface member 81 corresponds to the placement surface 87 where the article W is placed, and the lower surface of the first frame member 85a, the second frame member 85b, and the third frame member 85c correspond to the pallet bottom surface 83. The embodiment described below is described using the pallet P illustrated in FIG. 3.

Note that in the illustrated example, the pallet P used is made of wood. However, no such limitation is intended, and the pallet P used may be made of plastic or paper such as corrugated cardboard and the like.

3. Automated Warehouse

Next, the automated warehouse 3 will be described.

As illustrated in FIG. 1, the automated warehouse 3 is provided with the plurality of storage shelves 2 where the pallet P on which the article W is placed are stored, an enter conveyor 31 that transports the pallet P into the automated warehouse 3, an exit conveyor 32 that transports the pallet P out of the automated warehouse 3, and a stacker crane 6 that transports the pallet P between the plurality of storage shelves 2, the enter conveyor 31, and the exit conveyor 32.

In the present embodiment, the enter conveyor 31 is connected to the carry-in conveyor 5. In the illustrated example, the enter conveyor 31 is configured to transport the pallet P in the transportation direction X of the carry-in conveyor 5. The enter conveyor 31 receives the pallet P on which the article W is placed from the carry-in conveyor 5 and hands over the pallet P to the stacker crane 6. In the present example, the enter conveyor 31 is a roller conveyor. Also, in the present example, a vertical lift that moves the pallet P upward away from rollers 50 is provided at the handover position of the enter conveyor 31 where the pallet P is handed over to the stacker crane 6. Thus, the pallet P transported on the enter conveyor 31 is lifted up by the vertical lift at the handover position. Then, the fork of the stacker crane 6 is inserted into the lower side of the raised pallet P. Thereafter, the pallet P is transported to a housing portion 20 of the storage shelves 2 by the stacker crane 6.

In the present embodiment, the exit conveyor 32 is connected to the carry-out conveyor 4. In the illustrated example, the exit conveyor 32 is configured to transport the pallet P in the transportation direction (the direction parallel with the transportation direction X in this example) of the carry-out conveyor 4. The exit conveyor 32 receives the pallet P from the stacker crane 6 and transports the pallet P toward the carry-out conveyor 4. In the present example, the exit conveyor 32 is a roller conveyor similar to the enter conveyor 31. Note that the carry-out conveyor 4 is also a roller conveyor.

In the present embodiment, the stacker crane 6 is provided with a travel cart that travels along a guide rail 60 along the floor in the direction aligned with the transportation direction X, a mast erected in the travel cart, a lift body 63 that moves up and down along the mast, and a transfer device 61 supported by the lift body 63. The transfer device 61 moves in the transportation direction X when the travel cart travels and moves in the vertical direction Z along the mast when the lift body 63 moves up and down. In the present example, the transfer device 61 is provided with a fork that protruding and retracts in the width direction Y and is a sliding fork transfer device. Accordingly, the stacker crane 6 is capable of receiving the pallet P from the enter conveyor 31 and transporting the pallet P to a discretionary housing portion 20 of the storage shelves 2. Also, the stacker crane 6 is capable of retrieving the pallet P housed in a discretionary housing portion 20 and transport the pallet P to the exit conveyor 32 and hand the pallet P over.

Figure 5:
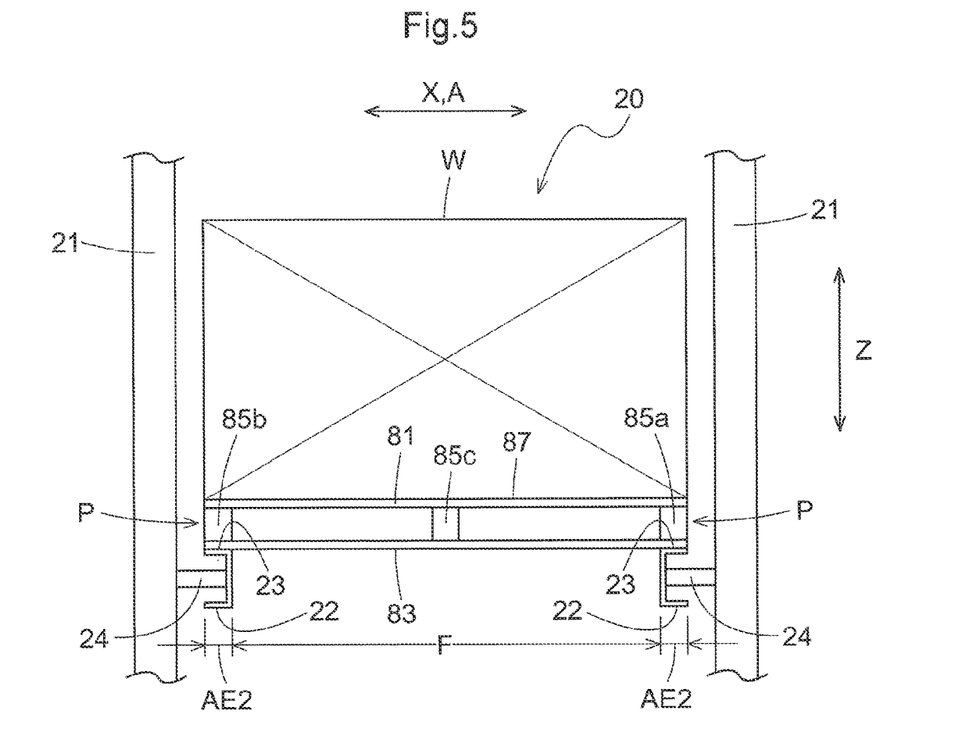
FIG. 5 is a front view of a housing portion.

In the present embodiment, as illustrated in FIGS. 1 and 5, the storage shelves 2 include a plurality of housing portions 20 that house the pallet P with the article W placed thereon. The plurality of housing portions 20 are formed in a plurality of rows and columns and are arranged in an orthogonal grid-like shape. In the illustrated example, the plurality of storage shelves 2 are provided arranged in the transportation direction X adjacent to the guide rail 60, with the front surface of each one of the plurality of storage shelves 2 facing the guide rail 60 side. In the present example, two storage shelves 2 are disposed on either side of the guide rail 60 in the width direction Y. Also, the front surfaces of the two storage shelves 2 are disposed facing one another. Next, the configuration of the storage shelves 2 will be described in detail.

In the present embodiment, as illustrated in FIG. 5, the storage shelves 2 are provided with a plurality of column members 21 that extending in the vertical direction Z. The plurality of column members 21 are disposed side by side with a certain interval between them in the transportation direction X and are disposed side by side with a certain interval between them in the width direction Y. The housing portions 20 are disposed side by side in the vertical direction Z between a pair of the column members 21 adjacent in the transportation direction X. On each one of the pair of column members 21 adjacent in the transportation direction X on either side of the housing portion 20, a shelf side support member 22 that projects from the column member 21 toward the housing portion 20 is provided. The pair of shelf side support members 22 provided in one housing portion 20 are disposed facing one another in the transportation direction X. In the present example, the shelf side support member 22 is connected to the column member 21 via an attachment member 24. Also, the shelf side support member 22 is disposed extending in the width direction Y. In the illustrated example, the shelf side support member 22 is configured as a U-shaped grooved member (grooved steel) with a cross-section orthogonal to the width direction Y that is angular in shape.

As illustrated in FIGS. 1 and 5, the pallet P is housed in the housing portion 20 of the storage shelves 2 supported from below by a pair of shelf side support surfaces 23. The pair of shelf side support surfaces 23 support the pallet P from below by coming into contact with the pallet bottom surface 83 from below. In the present embodiment, as illustrated in FIG. 5, the pair of shelf side support surfaces 23 are formed on the upper surfaces of the pair of shelf side support members 22. The pair of shelf side support surfaces 23 support the pallet P on which the article W is placed by supporting both end portions of the pallet bottom surface 83 in the first direction A from below.

As illustrated in FIGS. 1 and 5, using the orientation of the pallet P when housed in the storage shelves 2 as a reference, the pair of shelf side support surfaces 23 are formed extending in the second direction B and are disposed separated from one another in the first direction A by a specific separation distance F. The pair of shelf side support surfaces 23 are disposed extending in the direction that the frame body members 85 of the frame body 86 of the pallet P extend in the second direction B. In the present embodiment, the pair of shelf side support surfaces 23 are disposed at positions corresponding to the first frame member 85a and the second frame member 85b of the frame body members 85. In a state where the pallet P is housed in the storage shelves 2, one of the pair of shelf side support surfaces 23 overlaps the first frame member 85a as seen in the vertical direction Z and the other of the pair of shelf side support surfaces 23 overlaps the second frame member 85b as seen in the vertical direction Z. In the present embodiment, the separation distance F between the pair of shelf side support surfaces 23 in the first direction A corresponds to the distance between the first frame member 85*a* and the second frame member 85*b* of the pallet P in the first direction A. In the illustrated example, the separation distance F is equal to the distance between the first frame member 85*a* and the second frame member 85*b* in the first direction A. Note that "separation distance F" used herein indicates the interval (length of the space) between edges facing one another in the first direction A of the first frame member 85*a* and the second frame member 85*b*.

4. Carry-In Conveyor

Figure 6:
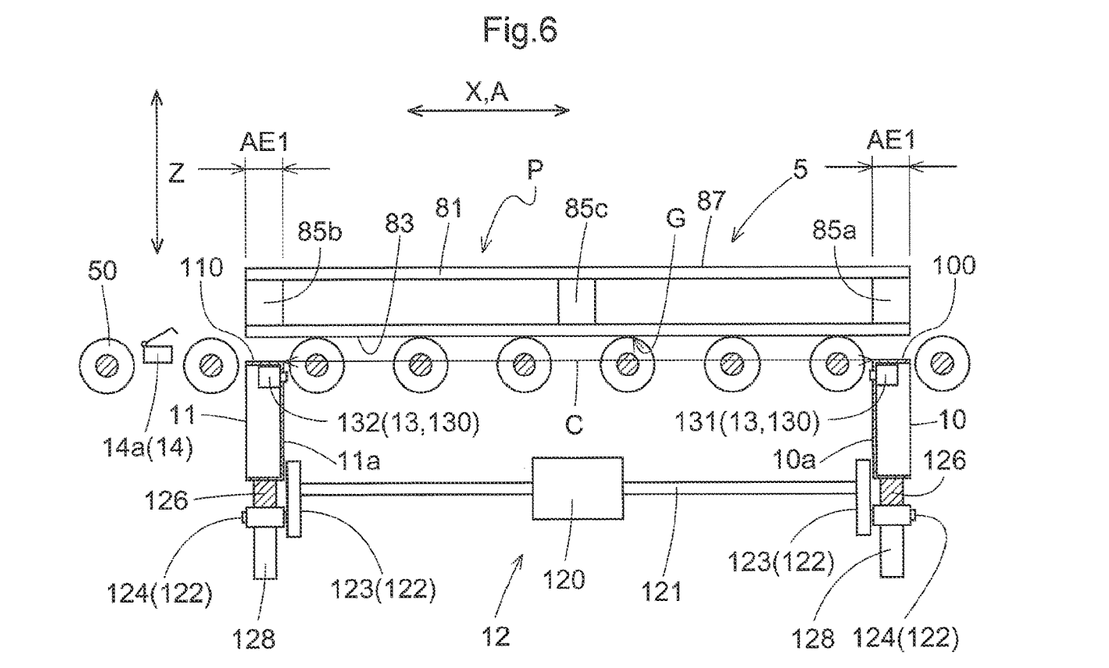
FIG. 6 is a front view of the pallet inspection device (retracted position).
Figure 8:
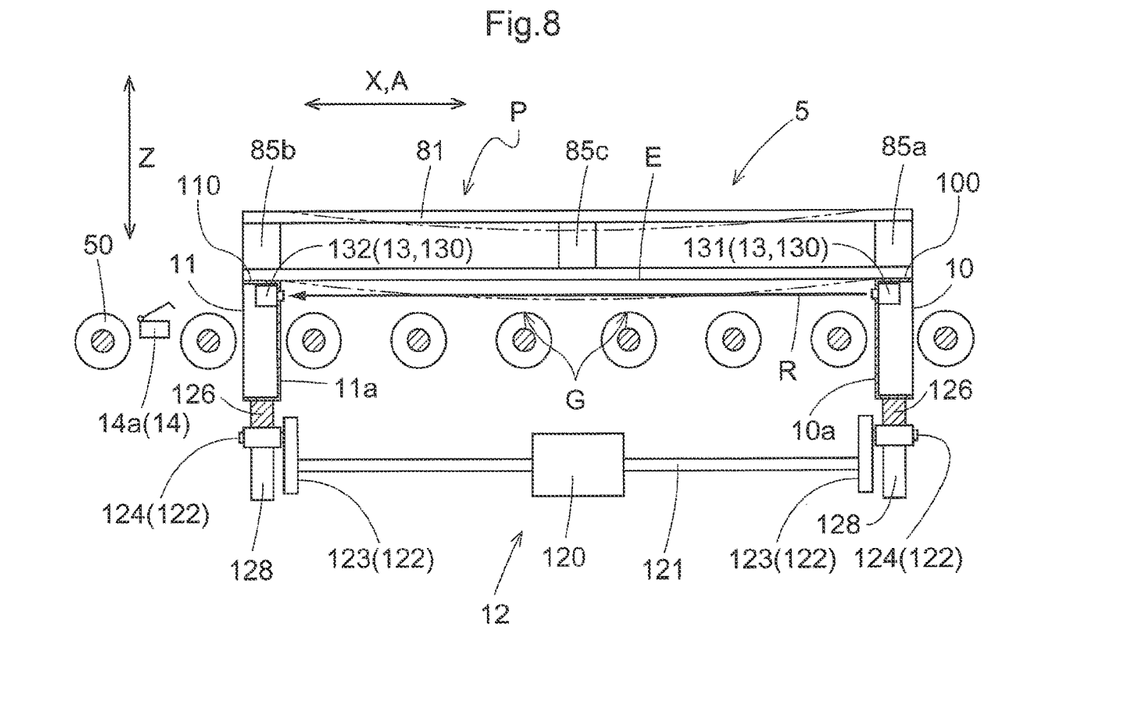
FIG. 8 is a front view of the pallet inspection device (projecting position).

Next, the carry-in conveyor 5 that transports the article W and the pallet P toward the automated warehouse 3 will be described. As described above, the carry-in conveyor 5 is connected to the enter conveyor 31. The carry-in conveyor 5 transports the pallet P from a predetermined place and hands the pallet P over to the enter conveyor 31. In the present embodiment, as illustrated in FIGS. 6 and 8, the carry-in conveyor 5 is provided with the plurality of roller 50 supported in a manner allowing for rotation about rotary axes extending in the width direction Y. In other words, in the present embodiment, the carry-in conveyor 5 is a roller conveyor. The plurality of rollers 50 are disposed side by side in the transportation direction X with a gap between one another in the transportation direction X. In the present example, a roller drive motor 72 (see FIG. 10) is used to rotate one roller 50 of the plurality of rollers 50, allowing for all of the plurality of rollers 50 connected to the one roller 50 via a gear, chain, or the like to be rotated. By rotating the plurality of rollers 50 in this manner, the carry-in conveyor 5 can transport the pallet P on which the article W is placed in the transportation direction X. Note that a configuration may be used in which the roller drive motor 72 is provided for each one of the plurality of rollers 50.

5. Pallet Inspection Device

Next, the pallet inspection device 1 will be described.

The pallet inspection device 1 inspects the pallet P transported in the transportation direction X placed on a transportation surface G of the carry-in conveyor 5. In the present example, as illustrated in FIG. 6, the surface of the carry-in conveyor 5 facing upward from the plurality of rollers 50 corresponds to the transportation surface G. In other words, a virtual plane including the upper ends of the plurality of rollers 50 corresponds to the transportation surface G. As illustrated in FIGS. 6 and 8, the pallet P on which the article W is placed is transported placed on the plurality of rollers 50 to the pallet inspection device 1. In the present embodiment, as described above, the carry-in conveyor 5 is disposed on a path for transporting the pallet P toward the automated warehouse 3. Thus, the pallet P on which the article W is placed can be inspected by the pallet inspection device 1 before the pallet P is housed in the storage shelves 2.

The pallet inspection device 1 is provided with a first lift member 10, a second lift member 11, a raising and lowering mechanism 12, and an inspection unit 13 attached to the carry-in conveyor 5. Also, in the present embodiment, the pallet inspection device 1 is further provided with a pallet detection unit 14. The first lift member 10 and the second lift member 11 are members for raising the pallet P placed on the transportation surface G of the carry-in conveyor 5 upward from the transportation surface G for inspection. The first lift member 10 and the second lift member 11 are configured to be raised and lowered via the raising and lowering mechanism 12. The inspection unit 13 inspects the pallet P raised upward from the transportation surface G by the first lift member 10 and the second lift member 11.

In the present embodiment, as illustrated in FIGS. 6 and 8, the first lift member 10 and the second lift member 11 are disposed separated in the transportation direction X. In this example, the first lift member 10 is disposed downstream from the second lift member 11 in the transportation direction X. The first lift member 10 and the second lift member 11 are configured to cooperate together as a pair of lift members and move vertically (move up and down). In the present example, the first lift member 10 and the second lift member 11 are supported by the raising and lowering mechanism 12. Also, the first lift member 10 and the second lift member 11 move vertically relative to the transportation surface G of the carry-in conveyor 5 when driven to be raised and lowered by the raising and lowering mechanism 12.

Also, in the present embodiment, the first lift member 10 and the second lift member 11 are each disposed in manner such that they move vertically in the gap between two of the rollers 50 adjacent in the transportation direction X. In other words, the first lift member 10 is disposed at a position in the transportation direction X that corresponds with a gap between two of the rollers 50 adjacent in the transportation direction X. The second lift member 11 is disposed at a position in the transportation direction X that corresponds with a gap between two of the rollers 50 adjacent in the transportation direction X at a different place to where the first lift member 10 is disposed. Also, the dimension in the transportation direction X of the first lift member 10 and the second lift member 11 is less than the gap between two of the rollers 50 adjacent in the transportation direction X.

The first lift member 10 is provided with a first support surface 100 that supports the pallet bottom surface 83. The first support surface 100 supports the pallet bottom surface 83 from below by coming into contact with the pallet bottom surface 83. In the present embodiment, the first lift member 10 is formed with a rectangular plate-like shape as seen in the transportation direction X. In the illustrated example, the first lift member 10 is configured as a U-shaped grooved member (grooved steel) with a cross-section orthogonal to the width direction Y that is angular in shape. Also, the first support surface 100 is formed on the upper surface of the first lift member 10. By the first lift member 10 and the second lift member 11 being raised, the first support surface 100 and a second support surface 110 described below come into contact with the pallet bottom surface 83. In other words, in a state where the first lift member 10 is raised to a position where the first support surface 100 is higher than the transportation surface G, the first support surface 100 supports the pallet bottom surface 83 from below the pallet P.

Figure 9:
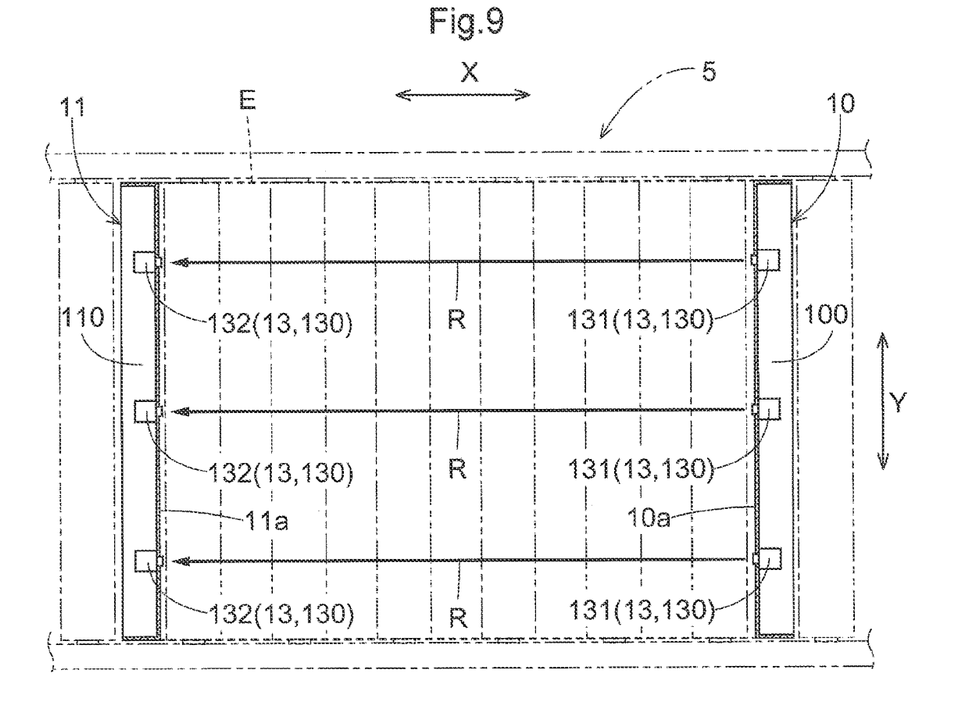
FIG. 9 is a plan view schematically illustrating a portion of the pallet inspection device.

In the present embodiment, as illustrated in FIG. 9, the first lift member 10 is disposed extending in the width direction Y. Thus, the first support surface 100 is also formed extending in the width direction Y. In the present example, the first support surface 100 is a rectangular flat surface that extends in the width direction Y. As illustrated in FIG. 1, in a state where the pallet P is being transported by the carry-in conveyor 5, the width direction Y is the direction aligned with the second direction B of the pallet P. Accordingly, the pallet bottom surface 83 is supported from below by the first support surface 100 extending in the second direction B.

The second lift member 11 is provided with the second support surface 110 that supports the pallet bottom surface 83. The second support surface 110 supports the pallet bottom surface 83 from below by coming into contact with the pallet bottom surface 83. In the present embodiment, the second lift member 11 is formed with a rectangular plate-like shape as seen in the transportation direction X. In the illustrated example, the second lift member 11 is configured as a U-shaped grooved member (grooved steel) with a cross-section orthogonal to the width direction Y that is angular in shape. Also, the second support surface 110 is formed on the upper surface of the second lift member 11. By the second lift member 11 and the first lift member 10 being raised, the second support surface 110 and the first support surface 100 come into contact with the pallet bottom surface 83. In other words, in a state where the second lift member 11 is raised to a position where the second support surface 110 is higher than the transportation surface G, the second support surface 110 supports the pallet bottom surface 83 from below the pallet P.

In the present embodiment, as illustrated in FIG. 9, the second lift member 11 is disposed extending in the width direction Y. Thus, the second support surface 110 is also formed extending in the width direction Y. In the present example, the second support surface 110 is a rectangular flat surface that extends in the width direction Y. As described above, in a state where the pallet P is being transported by the carry-in conveyor 5, the width direction Y is the direction aligned with the second direction B of the pallet P. Accordingly, the pallet bottom surface 83 is supported from below by the second support surface 110 extending in the second direction B.

Figure 2:
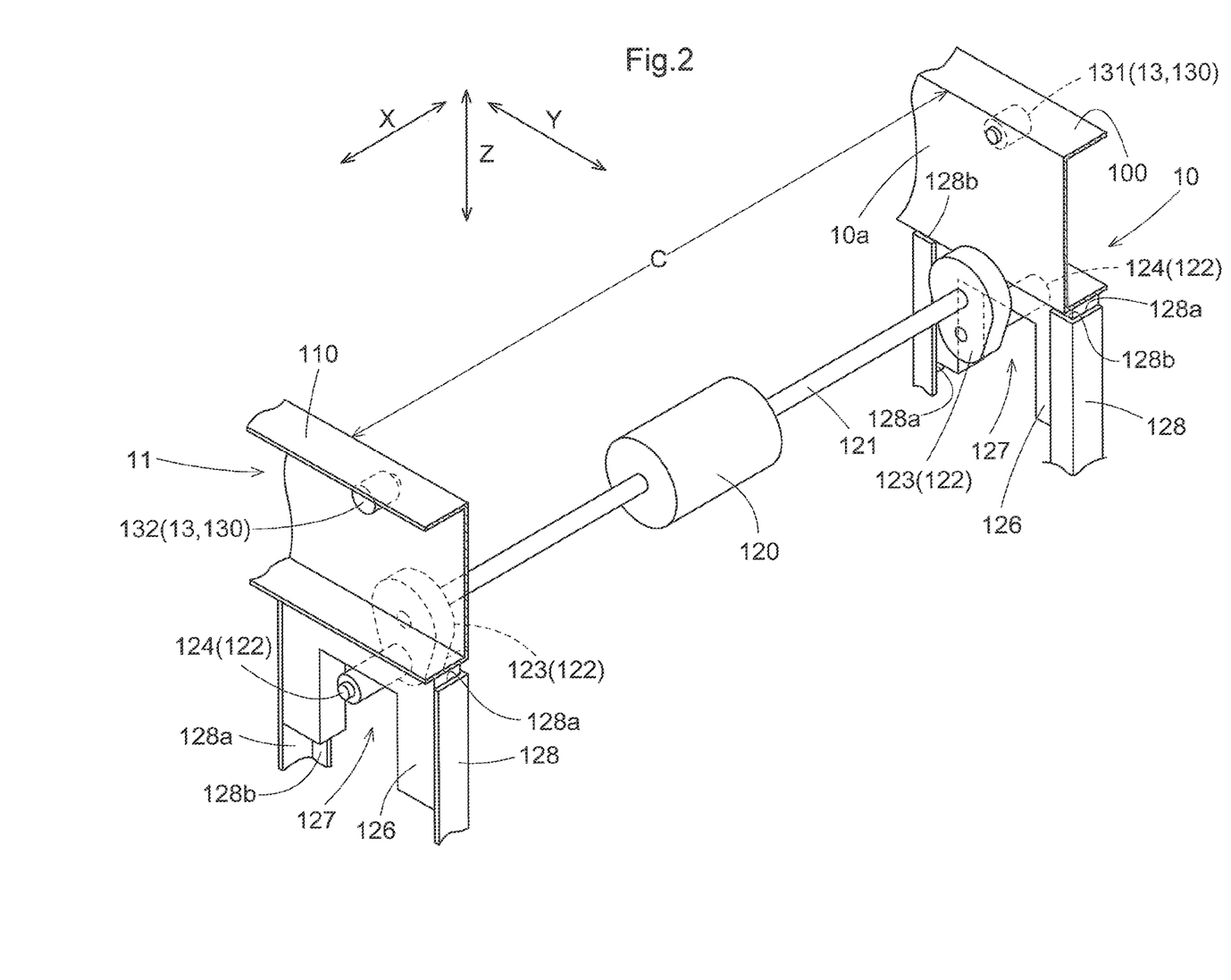
FIG. 2 is a perspective view illustrating a pallet inspection device.

As illustrated in FIGS. 2 and 6, the first support surface 100 and the second support surface 110 are disposed separated from one another in the transportation direction X by a specific setting distance C. Also, as illustrated in FIGS. 5 and 6, the setting distance C is set as a distance corresponding to the separation distance F between the pair of shelf side support surfaces 23. The setting distance C is preferably set depending on the separation distance F so that an inspection support surface contact region AE1, which is a region where the first support surface 100 and the second support surface 110 come into contact with the pallet bottom surface 83, and a shelf support surface contact region AE2, which is a region where the pair of shelf side support surfaces 23 come into contact with the pallet bottom surface 83, at least partially overlap one another. In the present embodiment, the setting distance C is set to be equal to the separation distance F. As described above, the separation distance F is equal to the distance between the first frame member 85a and the second frame member 85b of the pallet P in the first direction A. Thus, in the present example, the setting distance C is also equal to the distance between the first frame member 85a and the second frame member 85b of the pallet P in the first direction A. Accordingly, the setting distance C is set so that the second support surface 110 overlaps the second frame member 85b when the first support surface 100 overlaps the first frame member 85a as seen in the vertical direction Z. By setting the setting distance C in this manner, the pallet inspection device 1 can reproduce a state similar to the state when the pallet P is supported from below by the pair of shelf side support surfaces 23 in the storage shelves 2. Note that "setting distance C" used herein indicates the interval (length of the space) between edges facing one another in the transportation direction X of the first support surface 100 and the second support surface 110.

In the present embodiment, the shape of the first support surface 100 and the second support surface 110 are the same as the shape of the pair of shelf side support surfaces 23. Here, the shape being the same indicates that the external shape and area of the first support surface 100 and the second support surface 110 is the same/equal to the external shape and area of the pair of shelf side support surfaces 23. Accordingly, inspection by the pallet inspection device 1 can be performed with the pallet P supported from below via the first support surface 100 and the second support surface 110 having the same shape as the pair of shelf side support surfaces 23. This means that a state very similar to when the pallet P is housed in the storage shelves 2 can be reproduced when the pallet inspection device 1 performs inspection. Note that the configuration is not limited thereto, and, for example, the shape of the first support surface 100 and the second support surface 110 and the shape of the pair of shelf side support surfaces 23 may be set such that the dimension in the transportation direction X of the first support surface 100 and the second support surface 110 is the same as the dimension in the first direction A of the pair of shelf side support surfaces 23 and the dimension in the width direction Y of the first support surface 100 and the second support surface 110 is different from the dimension in the second direction B of the pair of shelf side support surfaces 23. Alternatively, the shape of the first support surface 100 and the second support surface 110 and the shape of the pair of shelf side support surfaces 23 may have a similar relationship as seen in the vertical direction Z.

The raising and lowering mechanism 12 is configured to raise and lower the first lift member 10 and the second lift member 11 between a retracted position where the first support surface 100 and the second support surface 110 are located lower than the transportation surface G and a projecting position where the first support surface 100 and the second support surface 110 are located higher than the transportation surface G. As illustrated in FIGS. 6 and 8, the raising and lowering mechanism 12 is capable of moving the pallet P from a state of being placed on the carry-in conveyor 5 to a state of being raised higher than the transportation surface G by raising the first lift member 10 and the second lift member 11 so that the first support surface 100 and the second support surface 110 are brought from the retracted position to the projecting position. Also, the raising and lowering mechanism 12 is capable of moving the pallet P from a state of being raised higher than the transportation surface G to a state of being placed on the carry-in conveyor 5 by lowering the first lift member 10 and the second lift member 11 so that the first support surface 100 and the second support surface 110 are brought from the projecting position to the retracted position.

Figure 7:
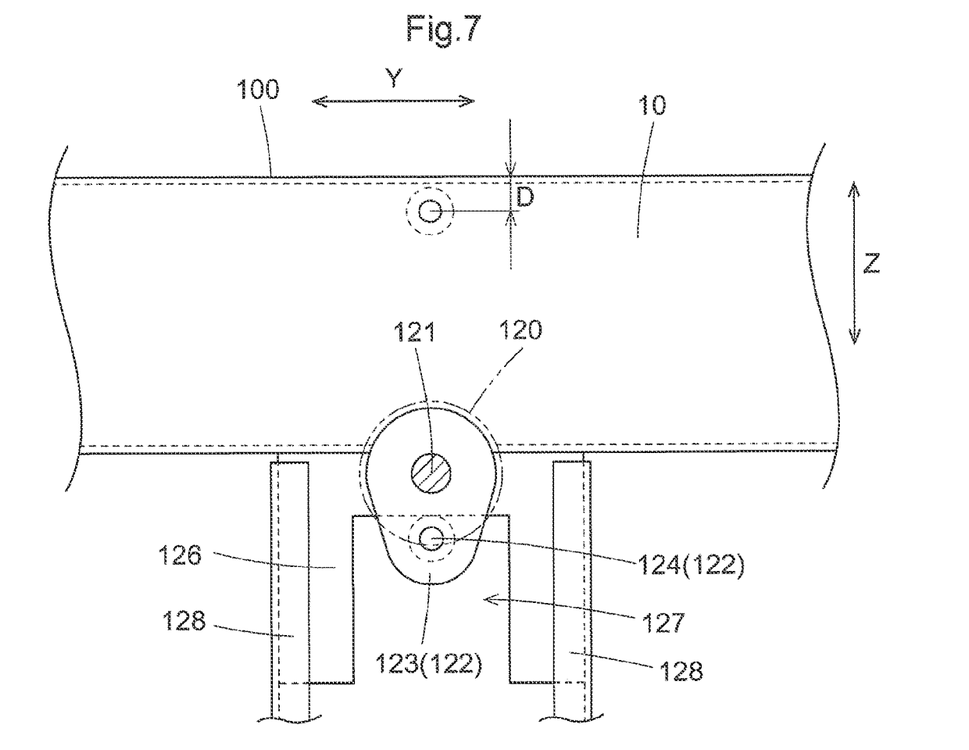
FIG. 7 is a side view of a lift member and a raising and lowering mechanism.

In the present embodiment, as illustrated in FIGS. 2 and 7, the raising and lowering mechanism 12 is provided with a drive device 120, a drive shaft 121 rotationally driven by the drive device 120, and a cam mechanism 122 that cooperates with the drive shaft 121. In the present example, a plurality of the cam mechanisms 122 are provided, and, specifically, two cam mechanisms 122, the same as the collective total number of first lift members 10 and second lift members 11, are provided. Also, the raising and lowering mechanism 12 is further provided with support members 126 that support the first lift member 10 and the second lift member 11 from below and guide rails 128 that are fixed to the floor and extend upward. As illustrated in FIG. 6, the raising and lowering mechanism 12 is disposed below the transportation surface G of the carry-in conveyor 5.

The drive device 120 is provided with a drive source such as an electric motor or the like. As illustrated in FIG. 2, the drive device 120 is connected to the drive shaft 121. In the present example, the drive device 120 is disposed between the first lift member 10 and the second lift member 11 in the transportation direction X. Thus, the drive shaft 121 is provided extending to both side in the transportation direction X from the drive device 120.

The cam mechanism 122 is provided with a cam roller 124 disposed separated from the drive shaft 121 in the radial direction of the drive shaft 121 and a connecting member 123 that connects the drive shaft 121 and the cam roller 124. In the present example, the connecting member 123 is formed in a plate-like shape (see FIG. 7). The cam roller 124 is disposed projecting from the connecting member 123 in the transportation direction X at a position separated from the drive shaft 121 in the radial direction, i.e., an eccentric position with respect to the rotation axis of the drive shaft 121. Also, the cam roller 124 is connected to the connecting member 123 in a state allowing for the cam roller 124 to rotate relative to the connecting member 123.

The support members 126 are fixed to the first lift member 10 and the second lift member 11. In the present embodiment, the support members 126 are provided extending downward from the first lift member 10 and the second lift member 11. In the present example, the support members 126 each include a cutout portion 127 cut out in an angular U-shape with the opening orientated downward. The cam roller 124 comes into contact with the portion of the cutout portion 127 that extends in the width direction Y (i.e., the upper edge portion of the cutout portion 127).

The guide rails 128 are guide mechanisms for guiding the movement of the support members 126 in the vertical direction Z. In the present embodiment, the guide rails 128 are disposed extending in the vertical direction Z and are configured to restrict the movement of the support members 126 in the transportation direction X and the width direction Y. In this manner, the guide rails 128 guide the support members 126 to move only in the vertical direction Z. In the present example, as illustrated in FIG. 2, the guide rail 128 on the first lift member 10 side and the guide rail 128 on the second lift member 11 side are each provided with a pair of width direction guiding surfaces 128a that are disposed outward in the width direction Y from the support member 126 and face one another in the width direction Y. Also, the guide rail 128 on the first lift member 10 side and the guide rail 128 on the second lift member 11 side are each provided with a transportation direction guiding surface 128b that faces outward in the transportation direction X. By providing these guiding surfaces, the guide rails 128 of the present example are formed as L-shaped angle members. The guide rails 128 are attached to the carry-in conveyor 5. Specifically, the guide rails 128 are fixed to a support frame for supporting the carry-in conveyor 5 on the floor.

In the present embodiment, when the drive device 120 rotationally drives the drive shaft 121, this motion in turn rotates the connecting member 123 of the cam mechanism 122. Also, in response to the rotation of the connecting member 123, the cam roller 124 connected at an eccentric position with respect to the rotation axis of the drive shaft 121 turns about the rotation axis of the drive shaft 121. Accordingly, the cam roller 124 moves in the vertical direction Z along an arc-shaped trajectory as seen in the transportation direction X, and the support members 126 supported by the cam roller 124 move in the vertical direction Z along the guide rails 128. Because the pair of support members 126 are each fixed to either the first lift member 10 or the second lift member 11, the rotation of the drive shaft 121 causes the first lift member 10 and the second lift member 11 to move vertically in a unified manner.

The inspection unit 13 inspects the pallet P supported by the first support surface 100 and the second support surface 110, with the first support surface 100 and the second support surface 110 being at the projecting position, for bending. In other words, as illustrated in FIG. 8, the first lift member 10 and the second lift member 11 are raised so that the first support surface 100 and the second support surface 110 are placed at the projecting position, and the inspection unit 13 performs an inspection with the first support surface 100 and the second support surface 110 supporting the pallet P from below. At this time, the pallet P has the article W placed thereon. In the present embodiment, the gap in the vertical direction Z between the plurality of rollers 50 and the pallet bottom surface 83 is used to put the pallet P in a state where it may bend (the two-dot chain line in FIG. 8), and the inspection unit 13 inspects the pallet P for bending.

In the present embodiment, an optical sensor 130 that constitutes the inspection unit 13 is attached to the first lift member 10 and/or the second lift member 11. In the example described here, the optical sensor 130 is attached to both the first lift member 10 and the second lift member 11 as illustrated in FIGS. 2, 6, and 8. Specifically, as the optical sensor 130, a transmission type optical sensor provided with a light projecting unit 131 and a light receiving unit 132 is used. In the present example, the light projecting unit 131 is attached to the first lift member 10. The light receiving unit 132 is attached to the second lift member 11. Also, the light projecting unit 131 and the light receiving unit 132 are attached to the first lift member 10 and the second lift member 11 in a manner such that they face one another in the transportation direction X. More specifically, the light projecting unit 131 is attached to a first inner side surface 10a of the first lift member 10, and the light receiving unit 132 is attached to a second inner side surface 11a of the second lift member 11.

In the present embodiment, the optical sensor 130 is disposed in a manner such that a plurality of optical axes R are formed running parallel with a virtual plane E including the first support surface 100 and the second support surface 110. In the present example, as illustrated in FIGS. 8 and 9, the plurality of optical axes R run parallel with the virtual plane E and are aligned with the transportation direction X. Here, as illustrated in FIG. 9, three optical axes R are formed side by side in the width direction Y with an interval therebetween. Specifically, three light projecting units 131 are attached to the first inner side surface 10a of the first lift member 10 side by side with a certain interval between them in the width direction Y. Also, three light receiving unit 132 are attached to the second inner side surface 11a of the second lift member 11 side by side with a certain interval between them in the width direction Y. Accordingly, the optical sensor 130 is provided with three sets of the light projecting unit 131 and the light receiving unit 132. Note that the number of optical axes R may be two or may be four or more. Also, the optical axes R may be formed in a direction inclined with respect to the transportation direction X. In this case, the plurality of optical axes R may be formed intersecting one another.

As illustrated in FIG. 7, the plurality of optical axes R are formed separated downward from the virtual plane E by a setting inspection distance D. In other words, the optical sensor 130 is attached to the first lift member 10 and the second lift member 11 in a manner such that all of the optical axes R are formed below the first support surface 100 and the second support surface 110 by the setting inspection distance D. Also, in a case where at least one of the plurality of optical axes R is blocked, the inspection unit 13 detects that there is bending in the pallet P. In the present embodiment, because the optical sensor 130 is provided with the light projecting unit 131 and the light receiving unit 132, in a case where, with any one of the sets including the light projecting unit 131 and the light receiving unit 132, the light receiving unit 132 does not detect light from the light projecting unit 131, bending in the pallet P is detected. In this manner, the inspection unit 13 is capable of detecting whether or not bending equal to or greater than the setting inspection distance D is present in the pallet P being inspected. Here, "bending equal to or greater than the setting inspection distance D" indicates a state in which there is a bend in the pallet bottom surface 83 to a degree that a portion is formed that is equal to or greater than the setting inspection distance D away from the virtual plane E, with respect to the ideal state in which the pallet bottom surface 83 is aligned with the virtual plane E. The deviation distance from the virtual plane E caused by the bending of the pallet bottom surface 83 is preferably set as the bending amount, and the setting inspection distance D is preferably set to a boundary value of a bending amount range in which the pallet P is determined to be normal and a bending amount range in which the pallet P is determined to be abnormal. For example, the bending amount range in which the pallet P is determined to be abnormal is preferably set as a bending amount likely to cause the pallet P to be unable to be normally retrieved from the housing portion 20 by the stacker crane 6 after the pallet P is housed in the housing portion 20 of the storage shelves 2. Alternatively, the bending amount range in which the pallet P is determined to be abnormal is preferably set as a bending amount likely to cause the pallet P to be unable to be normally handed over from the enter conveyor 31 to the stacker crane 6. Specifically, the appropriate value for the setting inspection distance D differs depending on the size of the pallet P, the weight and shape of the placed article W, and the like. However, for example, the setting inspection distance D can be set to a value ranging from 5 to 10 mm.

The pallet detection unit 14 detects the position of the pallet P relative to the pallet inspection device 1. In the present embodiment, the pallet detection unit 14 detects that the downstream end portion of the pallet P transported on the transportation surface G of the carry-in conveyor 5 in the transportation direction X has reached a specific detection position. In the present example, as illustrated in FIGS. 6 and 8, the pallet detection unit 14 is disposed in a manner allowing it to detect the pallet P at the detection position set upstream from the pallet inspection device 1. In this manner, by transporting and stopping the pallet P a specific transportation distance in the transportation direction X after the pallet detection unit 14 detects the pallet P, the pallet P can be stopped at an appropriate position corresponding to the first lift member 10 and the second lift member 11. Here, the specific transportation distance is preferably set depending on the distance in the transportation direction X from the detection position of the pallet detection unit 14 to the position of the first support surface 100 of the first lift member 10. In the illustrated example, the pallet detection unit 14 is provided with a limit switch 14a that is disposed projecting upward from the transportation surface G at the specific detection position and detects contact with the downstream end portion of the pallet P. Note that the pallet detection unit 14 may include an optical sensor or the like instead of the limit switch 14a.

6. Control

To implement the configuration described above, as illustrated in FIG. 10, the pallet inspection device 1 is provided with a control unit H that controls the carry-in conveyor 5, the pallet inspection device 1, and a notification unit 74. When the pallet P on which the article W is placed enters from the outside, the control unit H controls the roller drive motor 72 to rotate the rollers 50 of the carry-in conveyor 5. The rotation of the rollers 50 transports the pallet P in the transportation direction X. Also, when the pallet P is detected by the pallet detection unit 14 at the detection position set upward from the pallet inspection device 1, the control unit H controls the roller drive motor 72 to transport and stop the pallet P at the specific transportation distance in the transportation direction X after detection. Then, the control unit H controls the drive device 120 of the raising and lowering mechanism 12 to change the position of the first lift member 10 and the second lift member 11 from the retracted position to the projecting position. When the pallet P is raised higher than the transportation surface G by the raising and lowering mechanism 12, the control unit H controls the inspection unit 13 to start the inspection of the pallet P. Then, in a case where the inspection unit 13 detects bending equal to or greater than the setting inspection distance D in the pallet P, the control unit H controls a lamp 76 and/or a buzzer 77 provided in the article housing facility 7 to activate. In a case where the inspection unit 13 does not detect bending equal to or greater than the setting inspection distance D in the pallet P, the control unit H controls the drive device 120 of the raising and lowering mechanism 12 to change the position of the first lift member 10 and the second lift member 11 from the projecting position to the retracted position. In this manner, the pallet P is placed on the transportation surface G of the carry-in conveyor 5.

Figure 10:
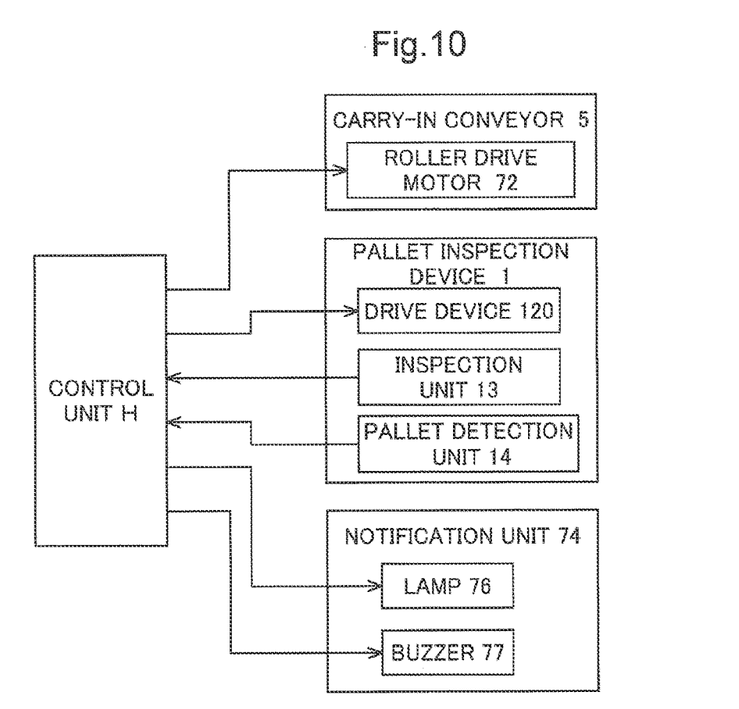
FIG. 10 is a control block diagram.

The control unit H controls the roller drive motor 72 to rotate the rollers 50 of the carry-in conveyor 5. In this manner, the pallet P on which the article W is placed is transported toward the automated warehouse 3.

7. Other Embodiments

Next, other embodiments of the pallet inspection device 1 will be described.

Figure 11:
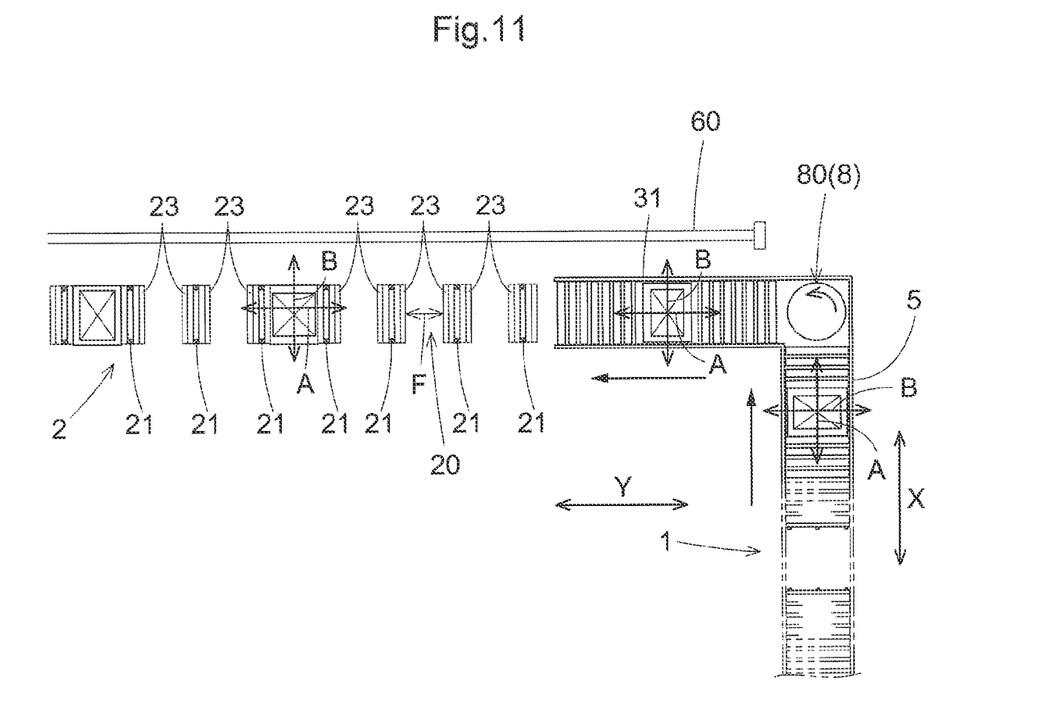
FIG. 11 is a plan view of a portion of an article housing facility according to another embodiment.

(1) In the embodiment described above, the front surfaces of the storage shelves 2 are disposed aligned with the transportation direction X, and the second direction B, which is the extension direction of the pair of shelf side support surfaces 23, is disposed aligned with the width direction Y orthogonal to the transportation direction X. However, the configuration is not limited thereto. For example, as illustrated in FIG. 11, the front surfaces of the storage shelves 2 may be disposed aligned with the width direction Y, and the second direction B, which is the extension direction of the pair of shelf side support surfaces 23, may be disposed aligned with the transportation direction X. In this case, a turning mechanism 8 is preferably provided that changes the orientation of the pallet P in the space between the pallet inspection device 1 and the housing portion 20 of the storage shelves 2. In the illustrated example, as the turning mechanism 8, a turn table 80 is provided at the connection portion where the carry-in conveyor 5 and the enter conveyor 31 are connected. The pallet P is turned 90 degrees about an axial center aligned with the vertical direction Z when placed on the turn table 80. By turning the pallet P in this manner, the orientation of the pallet P on the enter conveyor 31 and in the storage shelves 2 is such that the second direction B corresponds with the transportation direction X and the first direction A corresponds with the width direction Y. Accordingly, the pallet P can be housed in the storage shelves 2 with the extension direction of the pair of shelf side support surfaces 23 and the second direction B of the pallet P corresponding to the same direction and the separation direction of the pair of shelf side support surfaces 23 and the first direction A of the pallet P corresponding to the same direction. Thus, even with this configuration, the pallet can be put in a state similar to the state in which the pallet P is supported from below by the pair of shelf side support surfaces 23 at the storage shelves 2 and the state in which the pallet P is supported from below by the first support surface 100 and the second support surface 110 at the pallet inspection device 1.

(2) In the embodiment described above, the optical sensor 130 that constitutes the inspection unit 13 is a transmission type optical sensor provided with the light projecting unit 131 and the light receiving unit 132, with the light projecting unit 131 being attached to the first lift member 10 and the light receiving unit 132 being attached to the second lift member 11.

However, the configuration is not limited thereto. For example, the light receiving unit 132 may be attached to the first lift member 10, and the light projecting unit 131 may be attached to the second lift member 11. Also, a regression reflection type sensor may be used as the optical sensor 130. In this case, the light projecting unit 131 and the light receiving unit 132 are attached to one of the first lift member 10 or the second lift member 11, and a reflective mirror is attached to the other. Also, preferably, the inspection unit 13 may the optical sensor 130 that is capable of measuring distance such as a laser rangefinder. In this case, preferably, the inspection unit 13 may inspect for bending in the pallet P by detecting a difference between the distance from a reference position below the pallet P and the distance to the pallet bottom surface 83, with the pallet P put in a raised state by the raising and lowering mechanism 12. Also, instead of a laser rangefinder, a sensor other than an optical sensor 130 such as a probe type rangefinder may be used.

(3) In the embodiment described above, the pallet P is provided with the first frame member 85a, the second frame member 85b, and the third frame member 85c that constitute the frame body 86. However, the configuration is not limited thereto, and, for example, the frame body 86 and the placement surface member 81 may be integrally formed.

(4) In the embodiment described above, the carry-in conveyor 5 is a roller conveyor provided with the plurality of rollers 50 supported in a manner allowing for rotation about rotation axes aligned with the width direction Y. However, the configuration is not limited thereto, and, for example, the carry-in conveyor 5 may be other type of conveyor such as a chain conveyor or the like.

(5) Note that the configurations described in the embodiments described above can be used in combination with configurations described in other embodiments as long as inconsistencies are avoided. Also, regarding the other configurations, the embodiments described in the present specification are merely examples in all aspects. Accordingly, various modifications within the range of the present disclosure can be made as appropriate.

8. Supplement

A summary of the pallet inspection device described above will be given below.

A pallet inspection device that inspects a pallet transported in a specific transportation direction placed on a transportation surface of a conveyor, wherein: a direction orthogonal to the transportation direction as seen in a vertical direction aligned with the vertical direction is defined as a width direction; while the pallet is being transported by the conveyor, a direction of the pallet aligned with the transportation direction is defined as a first direction and a direction of the pallet aligned with the width direction is defined as a second direction; the pallet is transported to storage shelves by the conveyor and housed in the storage shelves supported from below by a pair of shelf side support surfaces; using an orientation of the pallet when housed in the storage shelves as a reference, the pair of shelf side support surfaces are formed extending in the second direction and are disposed separated from one another in the first direction by a specific separation distance; a first lift member a second lift member, a raising and lowering mechanism, and an inspection unit are provided attached to the conveyor; the first lift member is provided with a first support surface that supports a pallet bottom surface, which is a bottom surface of the pallet; the second lift member is provided with a second support surface that supports the pallet bottom surface; the raising and lowering mechanism is configured to raise and lower the first lift member and the second lift member between a retracted position where the first support surface and the second support surface are located lower than the transportation surface and a projecting position where the first support surface and the second support surface are located higher than the transportation surface; the first support surface and the second support surface are formed extending in the width direction and disposed separated from one another in the transportation direction by a specific setting distance; the setting distance is set as a distance corresponding to the separation distance of the pair of shelf side support surfaces; and the inspection unit inspects the pallet supported by the first support surface and the second support surface, with the first support surface and the second support surface being at the projecting position, for bending.

According to the present configuration, the first support surface and the second support surface that support the pallet bottom surface are raised and lowered between the retracted position and the projecting position by the raising and lowering mechanism. Thus, the pallet can be detected for bending when the pallet is raised higher than the transportation surface. Also, using the orientation of the pallet as a reference, the first support surface and the second support surface extend in the same direction as the pair of shelf side support surfaces of the storage shelves and are formed separated by a distance corresponding to the separation distance between the pair of shelf side support surfaces. Accordingly, on the conveyor, a similar state to that when the pallet is supported from below by the pair of shelf side support surfaces in the storage shelves can be reproduced, and bending in the pallet can be detected. Thus, according to the present configuration, while the pallet is being transported by the conveyor before being housed in the storage shelves, the pallet can be inspected for bending likely to occur when housed in the storage shelves.

According to the present configuration, before the pallet is housed in the storage shelves, the pallet can be appropriately inspected for bending likely to occur when housed in the storage shelves.

Here, the first support surface and the second support surface are preferably identical in shape to the pair of shelf-side support surfaces.

According to the present configuration, the inspection unit can detect bending in the pallet with the pallet being supported from below on support surfaces with the same shape as the shape of the pair of shelf side support surfaces. Thus, the pallet can be inspected for bending with the pallet in a state even more similar to the state when housed in the storage shelves.

Also, preferably, the inspection unit includes an optical sensor attached to at least either the first lift member or the second lift member; the optical sensor is oriented in such a manner as to have a plurality of optical axes that are parallel with a virtual plane extending through the first support surface and the second support surface and that are separate downward from the virtual plane by a setting inspection distance.

According to the present configuration, by appropriately setting the setting inspection distance in accordance with the acceptable limit of bending in the pallet, whether or not the bending in the pallet is greater than the acceptable limit can be inspected for on the basis of whether or not the pallet bottom surface is detected by the optical sensor. Also, here, because the optical sensor is disposed in a manner such that the plurality of optical axes run parallel with a virtual plane including the first support surface and the second support surface, bending across the entire bottom surface can be appropriately inspected for.

Also, preferably, the pallet includes (i) a placement surface member having a placement surface on which an article is placeable and (ii) a plurality of frame body members included in a frame body supporting the placement surface member from below; and the setting distance is such that the first support surface overlaps a first frame member and the second support surface overlaps a second frame member as seen in the vertical direction, the first frame member and the second frame member being opposite outer frame body members of the plurality of frame body members in the first direction.

In a case where the pallet is provided with the frame body members, typically, the pair of shelf side support surfaces of the storage shelves are configured to support the frame body member when the pallet is housed in the storage shelves.

According to the present configuration, bending in the pallet bottom surface can be detected when the first frame member and the second frame member located on both outer sides are supported by the first lift member and the second lift member. Thus, the pallet can be inspected for bending with the pallet in a state even more similar to the state when housed in the storage shelves.

Also, preferably, the conveyor includes a plurality of rollers each supported in such a manner as to be rotatable about a rotation axis along the width direction; the plurality of rollers are arranged in the transportation direction and apart from each other in the transportation direction; and the first lift member and the second lift member are each disposed in such a manner as to be capable of being raised and lowered through a gap between two rollers of the plurality of rollers which two rollers are adjacent to each other in the transportation direction.

According to the present configuration, in a case where the conveyor includes the plurality of rollers disposed side by side in the transportation direction with gaps therebetween, the first lift member and the second lift member can be appropriately disposed without significantly changing the configuration of the conveyor.

INDUSTRIAL APPLICABILITY

The technology according to the present disclosure can be applied to a pallet inspection device.

What is claimed is:

1. A pallet inspection device that inspects a pallet that is transported in a predetermined transportation direction while the pallet is on a transportation surface of a conveyor, wherein:
   (i) a width direction is a direction orthogonal to the transportation direction as seen in a vertical direction aligned with the vertical direction, (ii) a first direction is a direction of the pallet being transported by the conveyor which direction is along the transportation direction, and (iii) a second direction is a direction of the pallet being transported by the conveyor which direction is along the width direction,
   the pallet is transported to storage shelves by the conveyor, and is housed in the storage shelves while the pallet is supported from below by a pair of shelf-side support surfaces;
   with reference to an orientation of the pallet housed in the storage shelves, the pair of shelf-side support surfaces extend in the second direction and are separate from each other in the first direction by a predetermined separation distance;
   the pallet inspection device comprises:
   a first lift member;
   a second lift member;
   a raising and lowering mechanism; and
   an inspection unit all attached to the conveyor;
   the first lift member has a first support surface that supports a pallet bottom surface, which is a bottom surface of the pallet;
   the second lift member has a second support surface that supports the pallet bottom surface;
   the raising and lowering mechanism is configured to raise and lower the first lift member and the second lift member between (i) a retracted position, at which the first support surface and the second support surface are lower than the transportation surface, and (ii) a projecting position, at which the first support surface and the second support surface are higher than the transportation surface;
   the first support surface and the second support surface each extend in the width direction and are separate from each other in the transportation direction by a predetermined setting distance;
   the setting distance corresponds to the separation distance of the pair of shelf-side support surfaces; and
   the inspection unit inspects the pallet for bending while the pallet is supported by the first support surface and the second support surface at the projecting position.

2. The pallet inspection device according to claim 1, wherein the first support surface and the second support surface are identical in shape to the pair of shelf-side support surfaces.

3. The pallet inspection device according to claim 1, wherein:
   the inspection unit comprises an optical sensor attached to at least either the first lift member or the second lift member; and the optical sensor is oriented in such a manner as to have a plurality of optical axes that are parallel with a virtual plane extending through the first support surface and the second support surface and that are separate downward from the virtual plane by a setting inspection distance.

4. The pallet inspection device according to claim 1, wherein:
the pallet comprises (i) a placement surface member having a placement surface on which an article is placeable and (ii) a plurality of frame body members included in a frame body supporting the placement surface member from below; and
the setting distance is such that the first support surface overlaps a first frame member and the second support surface overlaps a second frame member as seen in the vertical direction, and the first frame member and the second frame member are opposite outer frame body members of the plurality of frame body members in the first direction.

5. The pallet inspection device according to claim 1, wherein:
the conveyor comprises a plurality of rollers each supported in such a manner as to be rotatable about a rotation axis along the width direction;
the plurality of rollers are arranged in the transportation direction and apart from each other in the transportation direction; and
the first lift member and the second lift member are each disposed in such a manner as to be capable of being raised and lowered through a gap between two rollers of the plurality of rollers which two rollers are adjacent to each other in the transportation direction.

\* \* \* \* \*